United States Patent
Miyazaki et al.

(10) Patent No.: US 6,947,259 B2
(45) Date of Patent: Sep. 20, 2005

(54) MAGNETIC HEAD, MAGNETIC HEAD DEVICE AND MAGNETIC RECORDING/REPRODUCING DEVICE

(75) Inventors: Masahiro Miyazaki, Chuo-ku (JP); Kazuhiko Maejima, Chuo-ku (JP)

(73) Assignee: TDK Corporation, Tokyo (JP)

( * ) Notice: Subject to any disclaimer, the term of this patent is extended or adjusted under 35 U.S.C. 154(b) by 105 days.

(21) Appl. No.: 10/623,663

(22) Filed: Jul. 22, 2003

(65) Prior Publication Data

US 2004/0125502 A1 Jul. 1, 2004

(30) Foreign Application Priority Data

Jul. 30, 2002 (JP) ........................................ 2002-221922

(51) Int. Cl.$^7$ .............................................. G11B 5/60
(52) U.S. Cl. ................................ 360/234.7; 360/235.7; 360/236.5
(58) Field of Search .......................... 360/234.7, 235.7, 360/236.5

(56) References Cited

U.S. PATENT DOCUMENTS 4,219,853 A * 8/1980 Albert et al. ............ 360/234.7

FOREIGN PATENT DOCUMENTS

| JP | 49-125008 A | 11/1974 |
| JP | A 10-222816 | 8/1998 |
| JP | A 11-66518 | 3/1999 |
| JP | A 2000-268329 | 9/2000 |

* cited by examiner

Primary Examiner—Robert S. Tupper
(74) Attorney, Agent, or Firm—Oliff & Berridge, PLC (57) ABSTRACT

A magnetic head includes a slider and an electromagnetic conversion element. The slider includes a base, a protective film and a medium opposing surface along a long direction of the magnetic head. The protective film is provided on a side surface of the base so as to be integrated with the base. The electromagnetic conversion element is provided on the side surface of the base, and covered with the protective film. A distance $\alpha 1$ between the electromagnetic conversion element and a medium contacting edge of the protective film is set within 50–200 $\mu$m.

7 Claims, 5 Drawing Sheets

MAGNETIC HEAD, MAGNETIC HEAD DEVICE AND MAGNETIC RECORDING/REPRODUCING DEVICE

BACKGROUND OF THE INVENTION

1. Field of the Invention

This invention relates to a magnetic head, a magnetic head device and a magnetic recording/reproducing device which are usable for a flexible magnetic recording medium such as a flexible disk or a magnetic tape.

2. Related Art Statement

As a typical magnetic recording/reproducing device is exemplified a flexible disk device (FDD), which is employed so as to back up a hard disk device (HDD). As of now, the FDD is constructed as a MIG (metal-in-gap) type magnetic head.

Whereas, recently, it is required to develop the recording density of the FDD as a backup memory device with the development of the recording density of the HDD, so the conventional MIG type magnetic head can not satisfy the requirement.

In this point of view, such an attempt is made as to employ a HDD type magnetic head suitable for high density recording, instead of the conventional MIG type magnetic head as the FDD.

In recording in the FDD, the magnetic head is contacted to the flexible magnetic recording medium such as a flexible disk. In recording in the HDD, in contrast, a not flexible disk is employed and the magnetic head is floated on the hard disk by a minute space. In the HDD, in this point of view, the thickness of the protective film of the magnetic head is set to a smaller thickness within 20–40 $\mu$m. Therefore, if the magnetic head for the HDD is employed in recording in the FDD, it may be affected by the flexible property of the flexible magnetic recording medium and the contact driving for the flexible magnetic recording medium. For example, the electromagnetic conversion element as a reproducing element, particularly, the magnetoresistive effective element may be crushed through the contact with the flexible recording medium. Also, the magnetic head may be worn remarkably to change the distance between the reproducing element and the flexible magnetic recording medium and thus, deteriorate the reliability with time of the magnetic head.

SUMMARY OF THE INVENTION

It is an object of the present invention to provide a magnetic head wherein an electromagnetic conversion element is not crushed through the contact with a flexible magnetic recording medium, and to provide a magnetic head device and a magnetic recording/reproducing device particularly such as a FDD which include the magnetic head.

It is another object of the present invention to provide a magnetic head with large abrasion resistance and high reliability with time, and a magnetic head device and a magnetic recording/reproducing device particularly such as a FDD which include the magnetic head.

For achieving the above objects, this invention relates to a magnetic head comprising a slider and an electromagnetic conversion element, the slider including a base, a protective film and a medium opposing surface along a long direction of the magnetic head, the protective film being provided on a side surface of the base so as to be integrated with the base, the electromagnetic conversion element being provided on the side surface of the base, and covered with the protective film, wherein a distance $\alpha 1$ between the electromagnetic conversion element and a medium contacting edge of the protective film is set within 50–200 $\mu$m.

The above-mentioned magnetic head is combined with a head supporting device to construct a magnetic head device. The magnetic head device is combined with a flexible magnetic recording medium such as a flexible disk to construct a magnetic recording/reproducing device particularly such as a FDD.

In the FDD, the magnetic head is contacted with and pressed against the flexible magnetic recording medium rotated at high velocity by a load from the head supporting device. In this condition, magnetic information is written in and read out of the flexible magnetic recording medium with the magnetic head.

In the magnetic head of the present invention, the slider includes the base and the protective film, and one surface of the slider in the thickness direction is opposed to the flexible magnetic recording medium. The protective film is integrated with the base at the side edge thereof in the medium flow direction. Therefore, the slider is contacted with the flexible magnetic recording medium at the medium contacting edge of the protective film. Since the electromagnetic conversion element is provided on the side surface of the base and covered with the protective film, it can be protected by the protective film when in the driving, the magnetic head is contacted with the flexible magnetic recording medium.

In the FDD, the magnetic head is held so that the medium opposing surface of the magnetic head is positioned on the main surface of the flexible magnetic recording medium at an angle of $\theta$. By controlling the angle $\theta$, the spacing loss between the flexible magnetic recording medium and the electromagnetic conversion element is set within a predetermined range.

The above-mentioned configuration of the FDD is well known in the FDD technology. The present invention is characterized in that the distance $\alpha 1$ between the electromagnetic conversion element and the medium contacting edge of the protective film is set within 50–200 $\mu$m.

Since the thickness of the protective film of the magnetic head for the HDD is set within 20–40 $\mu$m, as mentioned above, if the HDD magnetic head is employed in recording in the FDD, the magnetic head is affected by the flexible property of the flexible magnetic recording medium and the contact driving for the flexible magnetic recording medium, so that the electromagnetic conversion element, particularly, the magnetoresistive effective element may be crushed through the contact with the flexible recording medium, and the reliability with time of the magnetic head is deteriorated.

In order to iron out the these problems, in the present invention, the distance $\alpha 1$ between the electromagnetic conversion element and the medium contacting edge of the protective film is set to 50 $\mu$m or over. Therefore, the thickness of the protective film in the magnetic head of the present invention is set larger than the thickness of the protective film in the conventional magnetic head for the HDD by 10–30 $\mu$m. The difference in the thickness of the protective film affects remarkably on the performance of the magnetic head because constituents of the magnetic head are designed and fabricated in the order of nanometer or micrometer.

When in the FDD, the medium contacting edge of the protective film, that is, the slider is contacted with the flexible magnetic recording medium, the angle $\theta$ of the flexible magnetic recording medium for the main surface of the medium opposing surface of the magnetic head is decreased as the distance α1 between the electromagnetic conversion element and the medium contacting edge of the protective film is increased if the spacing loss between the flexible magnetic recording medium and the electromagnetic conversion element is maintained constant.

In the magnetic head of the present invention, the distance α1 is set larger than the conventional distance of 20–40 μm by 10–30 μm because of the larger thickness of the protective film, the angle θ between the medium opposing surface of the magnetic head and the main surface of the flexible magnetic recording medium in the magnetic head of the present invention is smaller than the one in the conventional HDD magnetic head if the spacing loss is maintained constant.

If the angle θ between the medium opposing surface of the magnetic head and the main surface of the flexible magnetic recording medium becomes small, the magnetic head is softly contacted with the flexible magnetic recording medium even at the time when the flexible magnetic recording medium is rotated at high velocity. Therefore, the magnetic head is not almost crushed through the contact with the flexible magnetic recording medium and the flexible magnetic recording medium is not worn. As a result, the reliability of the magnetic head can be enhanced.

Since the magnetic head is softly contacted with the flexible magnetic recording medium, the flexible magnetic recording medium is not almost waved. Therefore, the crush of the magnetic head on the contact with the waving area of the magnetic disk can be almost prevented. In this case, the wearing of the flexible magnetic recording medium can be almost prevented effectively.

The waving degree of the flexible magnetic recording medium becomes remarkably when the flexible magnetic recording medium is rotated at high velocity, so the prevention of the waving of the flexible magnetic recording medium is effective in writing and reading at high speed.

Since the magnetic head is softly contacted with the flexible magnetic recording medium, in the present invention, the Thermal Asperity noise of the magnetic head, originated from the heat generation due to the wearing against the flexible magnetic recording medium, can be reduced.

In the present invention, the distance α1 between the electromagnetic conversion element and the medium contacting edge of the protective film is set to 200 μm or below. As mentioned above, the magnetic head is softly contacted with the flexible magnetic recording medium as the distance α1 is increased and then, the angle θ is decreased. In this condition, the electromagnetic conversion element may be clashed in the side of the medium opposing surface to protrusions created on the main surface of the flexible magnetic recording medium and waving areas of the flexible magnetic recording medium, and thus, damaged. In this point of view, the distance α1 is set to 200 μm or below. In this case, the damage of the electromagnetic conversion element can be prevented, and the protective film defining the distance α1 can be easily fabricated by means of sputtering or the like. The lower limit of the distance α1 is preferably set to 100 μm. In this case, the above-mentioned effect relating to the soft contact of the magnetic head with the flexible magnetic recording medium can be enhanced.

Other objects, configurations and advantages will be described in detail hereinafter, with reference to the accompanying drawing. It is to be understood that the invention is not intended to be limited to the following specific embodiments.

BRIEF DESCRIPTION OF THE DRAWINGS

For a better understanding of this invention, reference is made to the attached drawings, wherein.

DETAILED DESCRIPTION OF PREFERRED EMBODIMENTS

Figure 1:
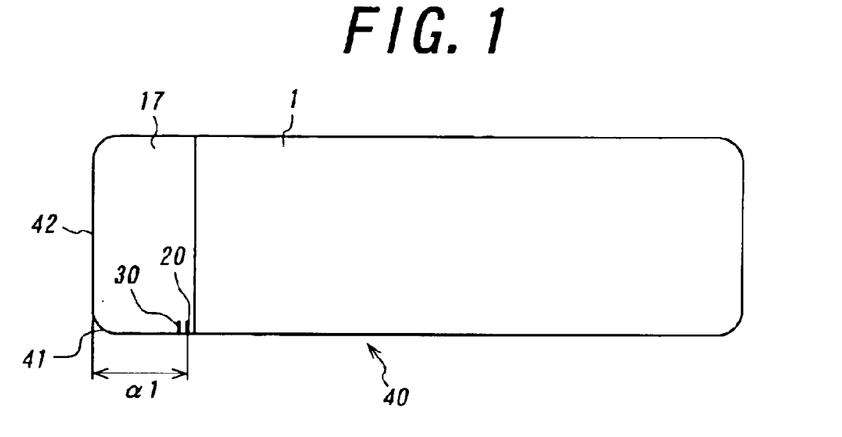
FIG. 1 is a side view showing a magnetic head according to the present invention.
Figure 2:
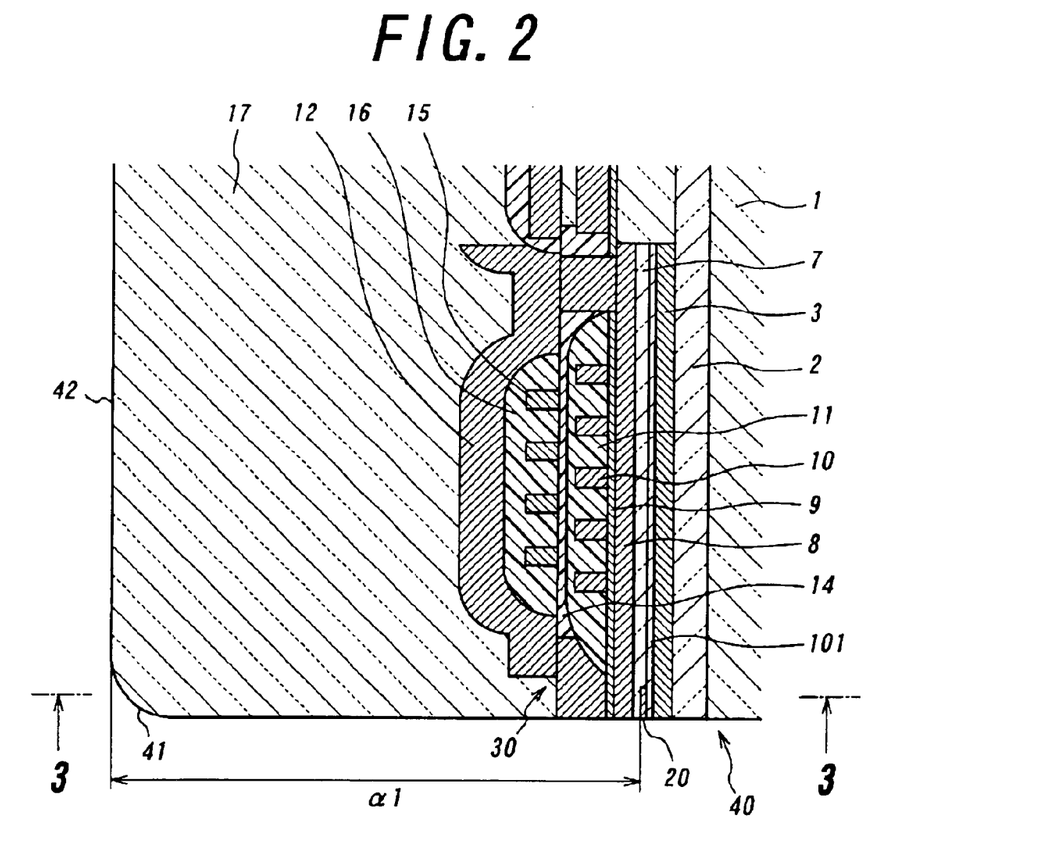
FIG. 2 is an enlarged cross sectional view partially showing the magnetic head illustrated in FIG. 1.
Figure 3:
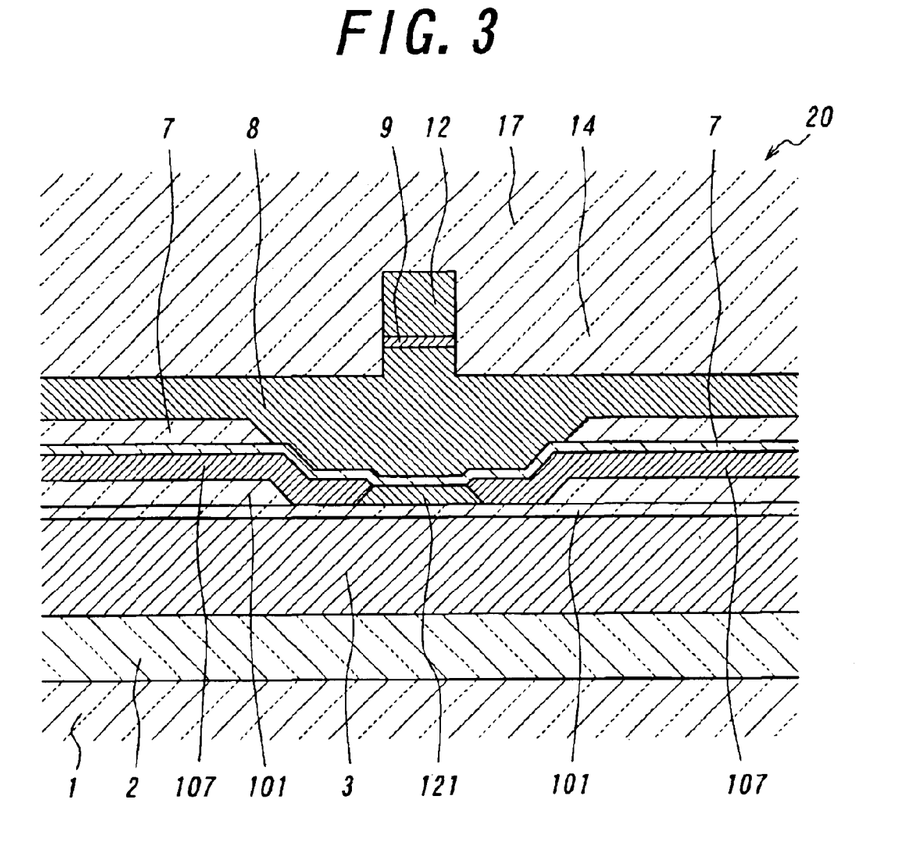
FIG. 3 is an enlarged cross sectional view partially showing the magnetic head, taken on line "3—3"

FIG. 1 is a side view showing a magnetic head according to the present invention, and FIG. 2 is an enlarged cross sectional view partially showing the magnetic head illustrated in FIG. 1. FIG. 3 is an enlarged cross sectional view partially showing the magnetic head, taken on line "3—3". In these figures, some constituents may be overdrawn to be different from real ones.

The magnetic head illustrated in FIGS. 1 and 2 includes sliders (1, 17) and electromagnetic conversion elements (20, 30). Each slider includes a base 1 and a protective film 17, and one surface of the slider in the thickness direction is exposed to be opposed to a magnetic recording medium. Therefore, the one surface of the slider constitutes a medium opposing surface 40.

The base 1 constitutes the slider base, and made from a ceramic material such as AlTiC ($Al_2O_3$—TiC). An insulating layer 2 is formed from an insulating material such as alumina ($Al_2O_3$) or $SiO_2$ in a thickness of 1–5 μm on the side surface of the base 1 along the long direction of the magnetic head.

The protective film 17 may be made from an inorganic insulating material with wearing resistance such as alumina ($Al_2O_3$), $SiO_2$, silicon nitride ($Si_3N_4$) or boron nitride (BN) in a thickness of 50–200 μm. The protective film 17 is formed on the side surface of the base 1 via the insulating layer 2 along the long direction of the magnetic head.

The insulating layer 2 and the protective film 17 are integrated with the base 1 to constitute the medium opposing surface 40 of the magnetic head with the base 1. The corner of the edge portion 42 of the protective film 17 in the long direction thereof, facing the medium opposing surface 40, constitutes a medium contacting edge 41.

One electromagnetic conversion element 20 constitutes a reproducing element, and the other electromagnetic conversion element 30 constitutes a recording element. The electromagnetic conversion element 20 is made of a magnetoresistive effective element such as a giant magnetoresistive effective element (GMR element). As the GMR element are exemplified a spin valve film (SV film), a ferromagnetic tunnel junction element (TMR element) and a CPP—GMR (Current Perpendicular to a Plane of a Giant Magnetoresistance) element where current is flowed perpendicular to the main surface of the SV film.

The electromagnetic conversion element 20 constituting the reproducing element is provided on the side surface of the base 1 via the insulating layer 2, and covered with the protective film 17. The magnetic field-detecting edge of the electromagnetic conversion element 20 is exposed to the medium opposing surface 40. In this embodiment, if the distance between the electromagnetic conversion element 20 and the medium contacting edge 41 of the protective film 17 is defined as a character of $\alpha 1$, the distance $\alpha 1$ is set within 50–200 $\mu$m. Preferably, the distance $\alpha 1$ is set to 100 $\mu$m or over.

The electromagnetic conversion element 30 constituting the recording element may be made of an inductive type magnetic conversion element, and the magnetic pole for writing of the element 30 is exposed to the medium opposing surface 40. The electromagnetic conversion element 30 is disposed in the vicinity of the electromagnetic conversion element 20, and covered with the protective film 17.

Referring to FIG. 3, the electromagnetic conversion element 20 includes a GMR element 121, an electrode layer 107, a bottom shielding layer 3, a top shielding layer 8, a bottom shielding gap layer 101 and a top shielding gap layer 7.

The bottom shielding layer 3 is made from permalloy (NiFe) or the like in a thickness of about 3 $\mu$m on the insulating layer 2 by means of sputtering, plating or the like.

The bottom shielding gap layer 101 is formed on the bottom shielding layer 3. The bottom shielding gap layer 101 is made from an insulating material such as alumina in a thickness of 10–200 nm by means of sputtering or the like. The GMR element 121 and the electrode layer 107 are formed in a thickness of several ten nanometers so as to be embedded in the bottom shielding gap layer 101.

The GMR element 121 and the electrode layer 107 are covered with the top shielding gap layer 7. The top shielding gap layer 7 is made from an insulating material such as alumina in a thickness (minimum thickness) of 10–200 nm by means of sputtering or the like. The top shielding layer 8 is formed so as to be opposed to the bottom shielding layer 3 via the GMR element 121.

The electromagnetic conversion element 30 includes a bottom magnetic pole layer 8, a top magnetic pole layer 12, a writing gap layer 9, and thin film coils 10, 15. The bottom magnetic pole layer 8 doubles as the top shielding layer 8.

The bottom magnetic pole layer 8 is formed on the top shielding gap layer 7, and magnetically joined with the top magnetic pole layer 12. The writing gap layer 9 is disposed between the magnetic poles of the bottom and the top magnetic pole layers 8 and 12. The thin film coils 10 and 15 are disposed in the inner gap between the bottom and the top magnetic pole layers 8 and 12 in electrical insulation.

Figure 4:
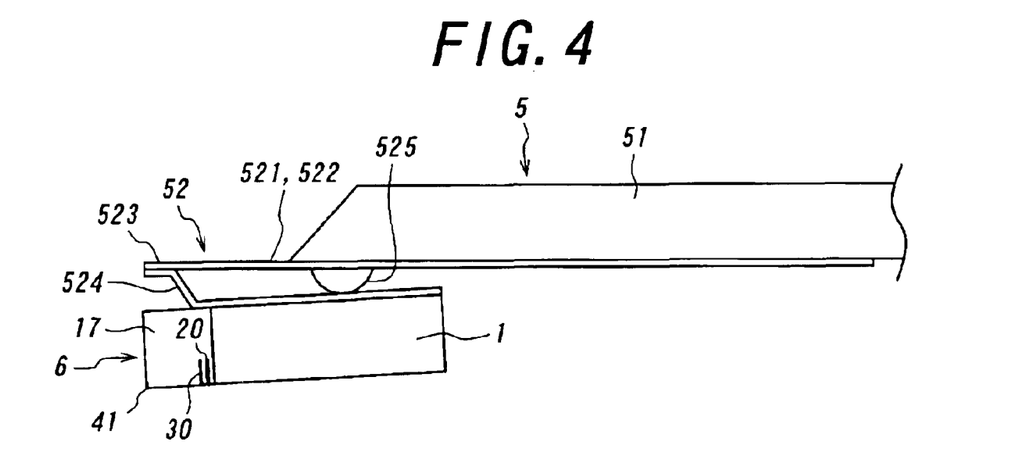
FIG. 4 is a side view showing a magnetic head device according to the present invention.

FIG. 4 is a side view showing a magnetic head device according to the present invention. In FIG. 4, the magnetic head device includes a magnetic head 6 as illustrated in FIGS. 1 and 2 and a head supporting device 5. The head supporting device 5 is composed of a supporter 51 made of a metallic plate and a flexibler 52 made of a metallic plate provided on the free edge of the supporter 51 in its longitudinal direction. The thin film magnetic head 6 is attached on the lower surface of the flexibler 52.

The flexibler 52 has two outerframes 521 and 522 substantially parallel to the supporter 51 in its long direction, a lateral frame 523 to join the outerframes 521 and 522 in the remote portion thereof from the supporter 51, and a tongue shaped member 524, of which the forefront is free, extending substantially parallel to the outerframes 521 and 522 from the almost central portion of the lateral frame 523.

On the lower surface of the supporter 51 is provided a hemispheric loading convex portion 525, which conducts a load to the tongue shaped member 524 from the free edge of the supporter 51. The magnetic head 6 is attached onto the lower surface of the tongue shaped member 524 with adhesive agent or the like.

The magnetic head 6 may be pitch-driven and roll-driven, and held so that the medium contacting edge 41 constructed of the corner of the medium opposing surface 40 of the protective film 17 is contacted with the magnetic recording medium.

The present invention is not limited to the above-mentioned magnetic head device 5, but applicable for any kind of magnetic head proposed previously or to be proposed in future. For example, the supporter 51 and the tongue shaped member 524 may be combined with a flexible polymer wiring plate such as TAB tape. Also, a magnetic head device of gimbal structure well known may be employed.

Figure 5:
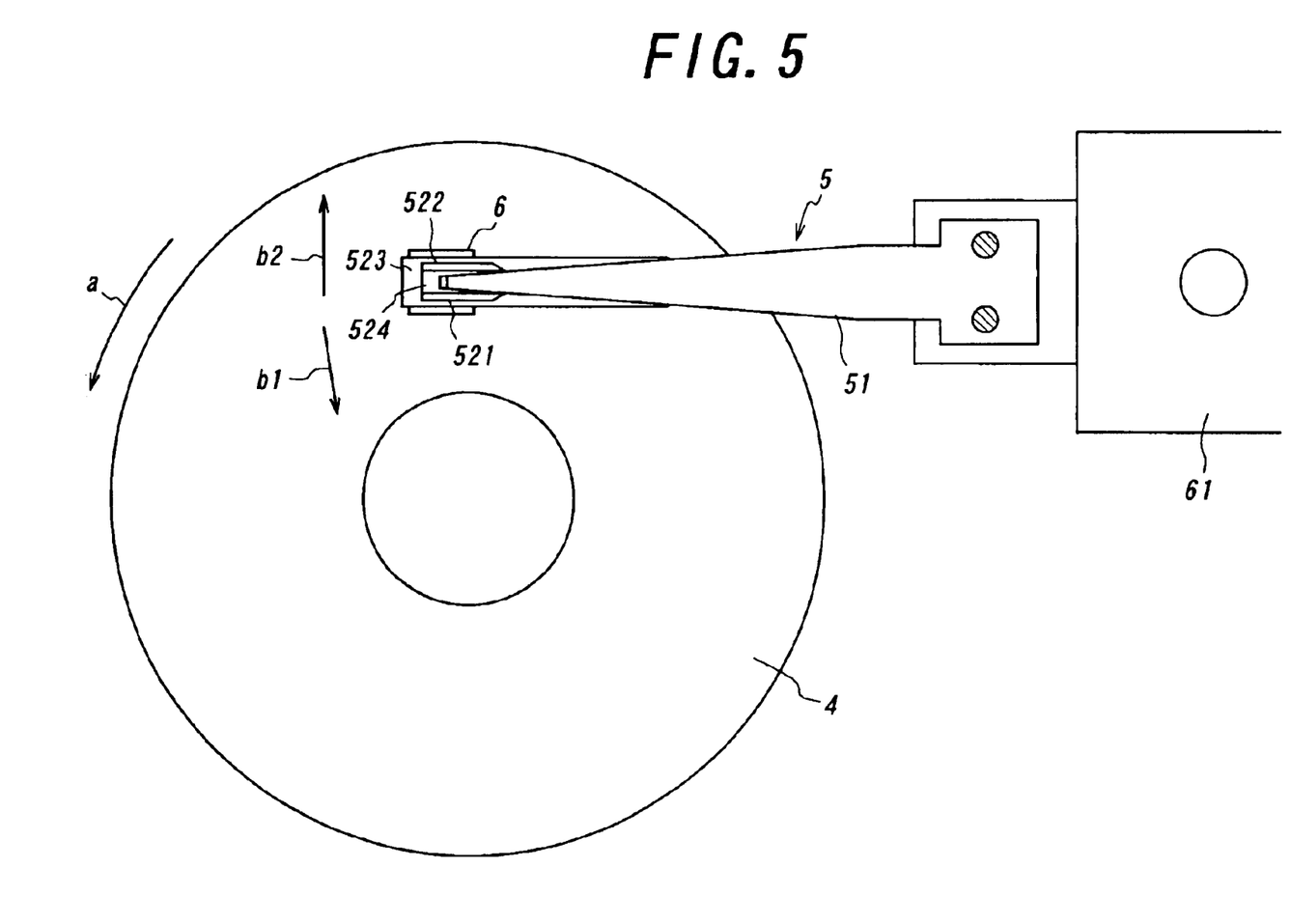
FIG. 5 is a plan view showing a magnetic recording/reproducing device including the magnetic head device illustrated in FIG. 4.
Figure 6:
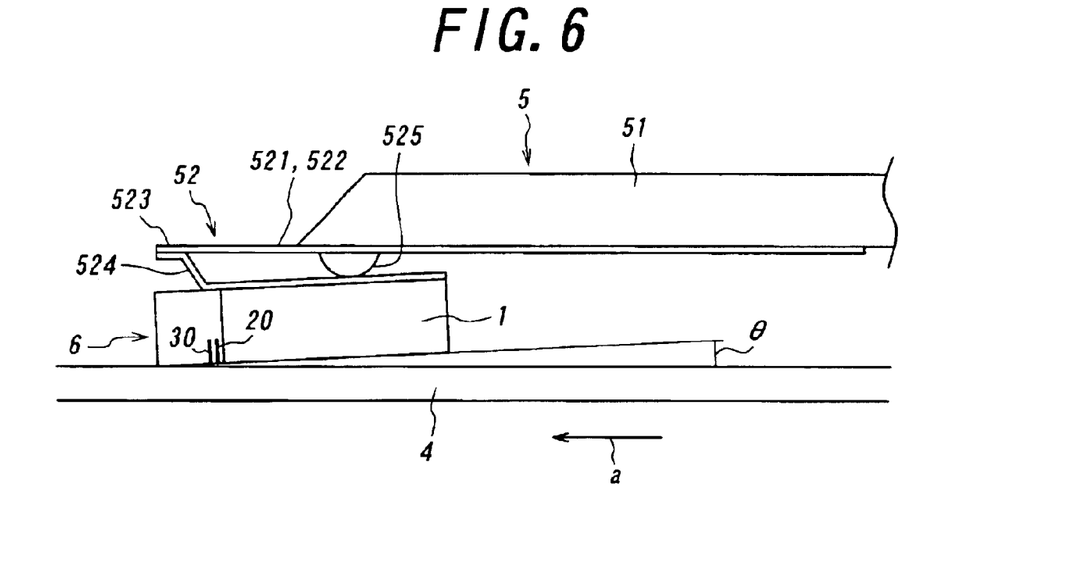
FIG. 6 is an enlarged side view showing the magnetic head device and the flexible magnetic recording device of the magnetic recording/reproducing device illustrated in FIG. 5.

FIG. 5 is a plan view showing a magnetic recording/reproducing device including the magnetic head device illustrated in FIG. 4, and FIG. 6 is an enlarged side view showing the magnetic head device and the flexible magnetic recording device of the magnetic recording/reproducing device illustrated in FIG. 5

The illustrated magnetic recording/reproducing device includes a magnetic head device as illustrated in FIG. 4, a position determining device 61 and a flexible magnetic recording medium 4. The position determining device 61 is driven on the principle of rotary actuator system, and supports the other edge of the head supporting device 5.

In this embodiment, the flexible magnetic recording medium 4 is composed of a flexible disk, a magnetic tape or the like, and performs magnetic recording and reproducing, cooperated with the magnetic head device 5. The flexible magnetic recording medium 4 is rotated at high velocity in the direction designated by the arrow "a" by means of not shown rotation driving mechanism.

The magnetic head 6 is driven in the direction designated by the arrow "b1" or "b2" by the head supporting device 5 and the position determining device 61 with being contacted with the flexible magnetic recording medium 4 at a given angle of θ, thereby to perform magnetic recording and reproducing for the flexible magnetic recording medium 4. The magnetic head 6 includes the slider composed of the base 1, the protective film 17 and the medium opposing surface 40 along the thickness direction. The protective film 17 is formed on and integrated with the base 1 along the medium flowing direction. In driving, therefore, the slider is contacted with the flexible magnetic recording medium 4 at the medium contacting edge 41 of the protective film 17. Since the electromagnetic conversion elements 20 and 30 are provided on the side surface of the base 1, and covered with the protective layer 17, in driving, the electromagnetic conversion elements 20 and 30 are protected with the protective film 17.

Then, the technical significance of the requirement of the distance α1 between the electromagnetic conversion element 20 and the medium contacting edge 41 of the protective film 17 being set within 50–200 μm will be described.

Figure 7:
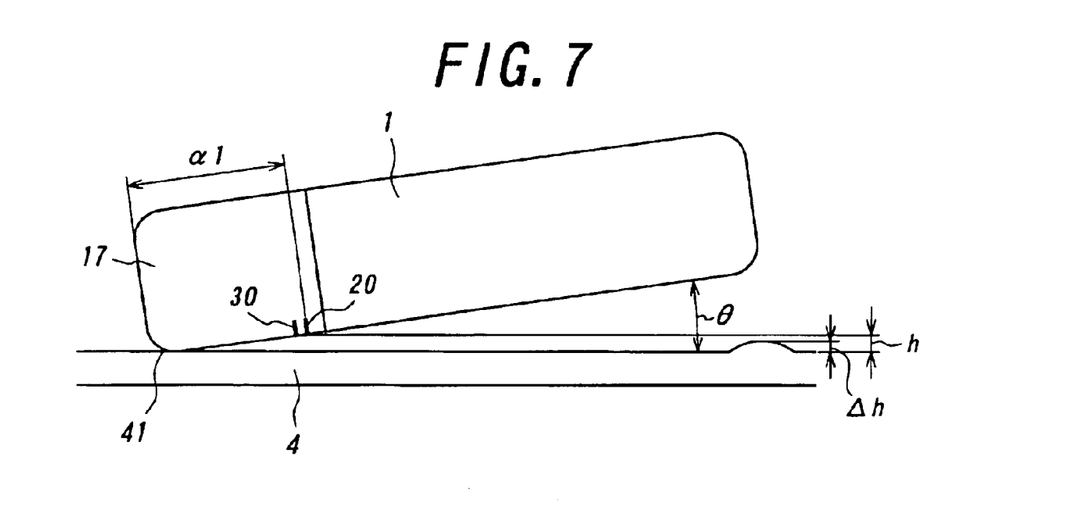
FIG. 7 is a schematic view showing the arrangement of the magnetic head and the flexible magnetic recording medium in the magnetic recording/reproducing device illustrated in FIG. 6.
Figure 8:
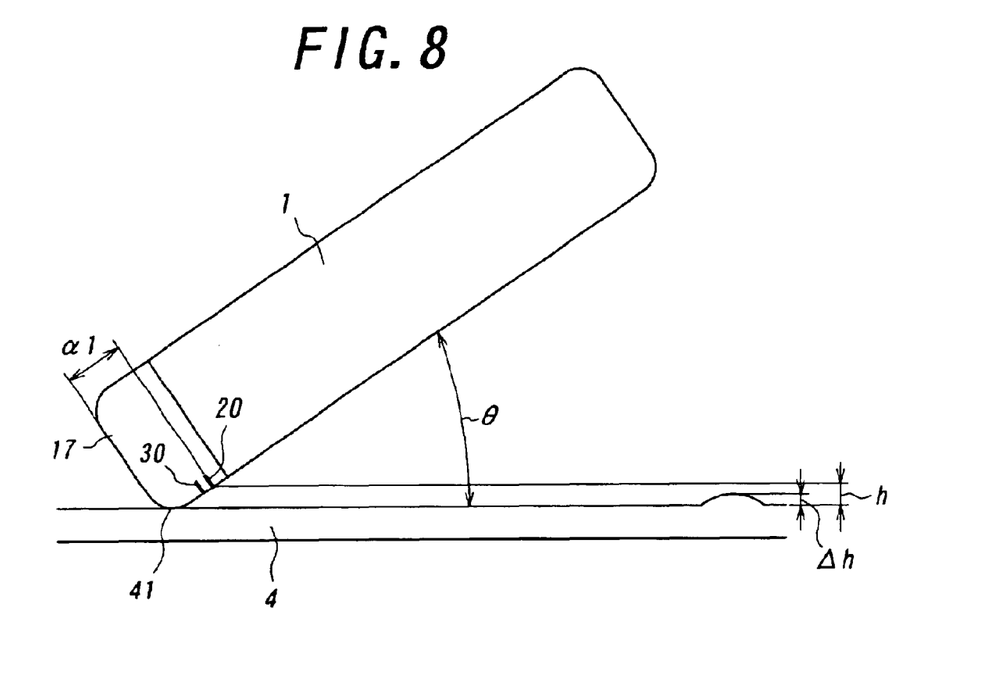
FIG. 8 is a schematic view showing the arrangement of the magnetic head and the flexible magnetic recording medium in a conventional recording/reproducing device.

FIG. 7 is a schematic view showing the arrangement of the magnetic head and the flexible magnetic recording medium in the magnetic recording/reproducing device illustrated in FIG. 6, and FIG. 8 is a schematic view showing the arrangement of the magnetic head and the flexible magnetic recording medium in a conventional recording/reproducing device. In these figures, the same numerals are given to like or corresponding constituents, compared with the ones in FIGS. 1–6, so explanation for like or corresponding constituents will be omitted.

The comparative magnetic head 6 illustrated in FIG. 8 is fabricated in the same manner except that the distance α1 between the electromagnetic conversion element 20 constituting a reproducing element and the medium contacting area 41 of the protective film 17 is set to 30 μm.

As illustrated in FIGS. 7 and 8, the spacing loss "h" between the electromagnetic conversion element 20 and the flexible magnetic recording medium 4 is set equally in the magnetic head 6 of the present invention and the comparative magnetic head 6. Too large spacing loss h may cause the decrease in the output of the magnetic head, and too small spacing loss h may cause the clash against the protrusion with a height of Δh. Therefore, the spacing loss h is appropriately designed so as to avoid these problems.

As illustrated in FIG. 8, in the comparative magnetic head 6, since the distance α1 is set to 30 μm, the angle θ between the magnetic head 6 and the flexible magnetic recording medium 4 is increased when the spacing loss h is maintained constant.

In the present invention, in contrast, the distance α1 between the electromagnetic conversion element 20 and the medium contacting edge 41 of the protective film 17 is set to 50 μm or over. That is, since the distance α1 of the magnetic head 6 of the present invention is set larger than the distance α1 of the conventional magnetic head 6 by 20 μm or over, the angle θ of the magnetic recording/reproducing device of the present invention is set smaller than the angle θ of a conventional HDD as shown in FIG. 8 if the spacing loss h is maintained constant.

The magnetic head 6 is softly contacted with the flexible magnetic recording medium 4 rotated at high velocity as the angle θ between the medium opposing surface 40 of the magnetic head 6 and the main surface of the flexible magnetic recording medium 4, so that the magnetic head 6 is not almost crushed through the contact with the flexible magnetic recording medium 4 and the flexible magnetic recording medium 4 is not worn. As a result, the reliability of the magnetic head 6 can be enhanced.

In the present invention, since the magnetic head 6 is softly contacted with the flexible magnetic recording medium 4, the flexible magnetic recording medium 4 is not almost waved. Therefore, the crush of the magnetic head 6 on the contact with the waving area of the magnetic recording medium can be almost prevented. In this case, the wearing of the flexible magnetic recording medium can be almost prevented effectively.

The waving degree of the flexible magnetic recording medium 4 becomes remarkably when the flexible magnetic recording medium 4 is rotated at high velocity, so the prevention of the waving of the flexible magnetic recording medium 4 is effective in writing and reading at high speed.

Since the magnetic head 6 is softly contacted with the flexible magnetic recording medium, in the present invention, the Thermal Asperity noise of the magnetic head 6, originated from the heat generation due to the wearing against the flexible magnetic recording medium 4, can be reduced.

In the present invention, the distance α1 is also set to 200 μm or below. As mentioned above, the magnetic head 6 is softly contacted with the flexible magnetic recording medium 4 as the distance α1 is increased and then, the angle θ is decreased. In this condition, the electromagnetic conversion elements 20 and 30 may be clashed in the side of the medium opposing surface to the protrusion with the height of Δh created on the main surface of the flexible magnetic recording medium 4 and waving areas of the flexible magnetic recording medium 4, and thus, damaged. In this point of view, the distance α1 is set to 200 μm or below. In this case, the damage of the electromagnetic conversion element can be prevented.

If the distance α1 is set to 200 μm or over, the protective film 17 defining the distance α1 can be easily fabricated by means of sputtering or the like. The lower limit of the distance α1 is preferably set to 100 μm. In this case, the above-mentioned effect relating to the soft contact of the magnetic head 6 with the flexible magnetic recording medium 4 can be enhanced.

Figure 9:
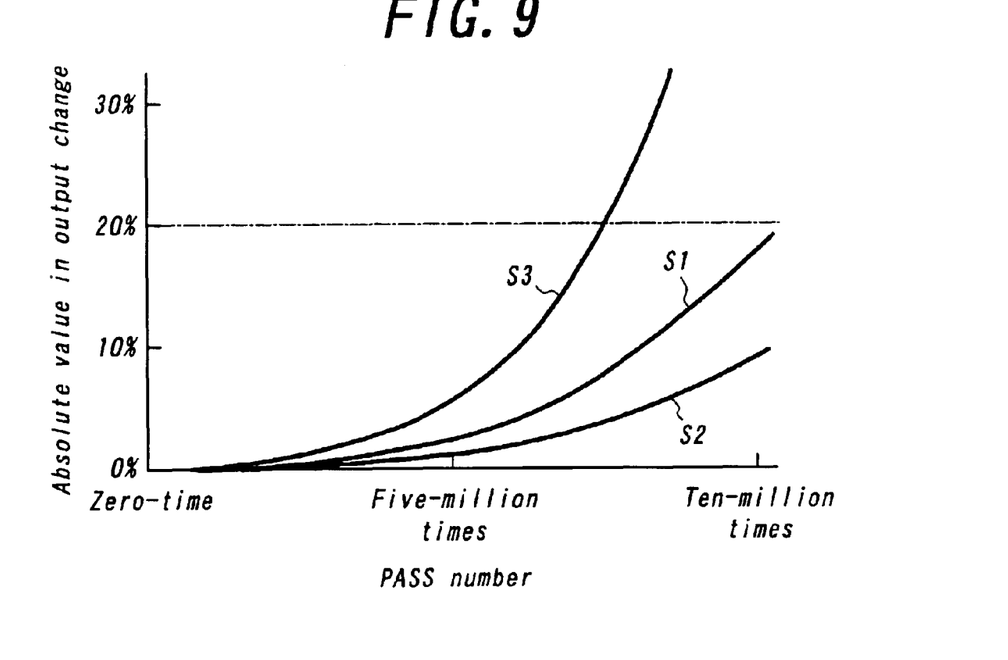
FIG. 9 is a graph showing measurement results in sliding test.

FIG. 9 is a graph showing measurement results in sliding test. In the sliding test, the magnetic heads were mounted on their respective drivers, and the decreases in outputs of the magnetic heads were measured. In FIG. 9, the ordinate designates absolute values (%) in output change of the magnetic heads, and the abscissa designates the number of the sliding test (hereinafter, called as "PASS number").

The curve S1 designates the sliding test performance of the magnetic head of the present invention where the distance α1 is set to 50 μm, and the curve S2 designates the sliding test performance of the magnetic head of the present invention where the distance α1 is set to 100 μm. The curve S3 designates the sliding test performance of the conventional magnetic head where the distance α1 is set 30 μm. The curves S1–S3 are averaged on 20 measurement data, respectively.

A flexible magnetic recording medium spin stand with a size of 3.5 inches and a magnetic field output of about 1400 (Oe) was employed as the driver. The speed of the spin rotation was set to 3000 rpm. In the sliding test, the allowable changing range in output of the magnetic heads were set within 20% after ten-million times writing and reading, which is defined as a standard range.

As is apparent from the curve S3 in FIG. 9, the change in output of the conventional magnetic head is beyond the standard range after the ten-million times writing and reading. Concretely, all of the 20 conventional magnetic heads were beyond the standard range.

As is apparent from the curves S1 and S2 in FIG. 9, in contrast, the changes in output of the magnetic heads of the present invention are within the standard range because the distances α1 of the magnetic heads are set to 50 μm and 100 μm, respectively. Concretely, in the case of the distance α1 of 50 μm, 12 magnetic heads (60%) are within the standard range after the ten-million writing and reading. In the case of the distance α1 of 100 μm, 18 magnetic heads (90%) are within the standard range after the ten-million times writing and reading. In this sliding test, the change in output of the magnetic head with the distance α1 of 100 μm is smaller than that of the magnetic head with the distance α1 of 50 μm.

Although the present invention was described in detail with reference to the above examples, this invention is not limited to the above disclosure and every kind of variation and modification may be made without departing from the scope of the present invention.

As mentioned above, according to the present invention, some advantages can be provided as follows:

(A) A magnetic head wherein an electromagnetic conversion element constituting a reproducing element is not crushed through the contact with a flexible magnetic recording medium can be provided, and a magnetic head device and a magnetic recording/reproducing device including the magnetic head can be provided.

(B) A magnetic head with large abrasion resistance and high reliability with time can be provided, and a magnetic head device and a magnetic recording/reproducing device including the magnetic head can be provided.

What is claimed is:

1. A magnetic head comprising a slider and an electromagnetic conversion element, said slider including a base, a protective film and a medium opposing surface along a long direction of said magnetic head, said protective film being provided on a side surface of said base so as to be integrated with said base, said electromagnetic conversion element being provided on said side surface of said base, and covered with said protective film, wherein a distance $\alpha 1$ between said electromagnetic conversion element and a medium contacting edge of said protective film is set greater than 50 $\mu$m and less than or equal to 200 $\mu$m.

2. The magnetic head as defined in claim 1, wherein said distance $\alpha 1$ is set to 100 $\mu$m or over.

3. The magnetic head as defined in claim 1, wherein said electromagnetic conversion element includes a reproducing element made of a magnetoresistive effective element, and said distance $\alpha 1$ is defined on said reproducing element.

4. The magnetic head as defined in claim 1, wherein said electromagnetic conversion element includes a recording element made of an inductive type magnetic conversion element.

5. A magnetic head device comprising a magnetic head as defined in claim 1 and a head supporting device to support said magnetic head.

6. A magnetic recording/reproducing device comprising a magnetic head device as defined in claim 5 and a flexible magnetic recording medium which perform magnetic recording and reproducing cooperated with said magnetic head device.

7. A magnetic head comprising a slider and an electromagnetic conversion element, said slider including a base, a protective film and a medium opposing surface along a long direction of said magnetic head, said protective film being provided on a side surface of said base so as to be integrated with said base, said electromagnetic conversion element being provided on said side surface of said base, and covered with said protective film, wherein a distance $\alpha 1$ between said electromagnetic conversion element and a medium contacting edge of said protective film is greater or equal to 100 $\mu$m and less than or equal to 200 $\mu$m.

* * * * *